(12) United States Patent
Drake (10) Patent No.: US 12,252,629 B2
(45) Date of Patent: Mar. 18, 2025

(54) ELECTRONIC DEVICE WITH SELF-DISINFECTING TOUCH SCREEN AND METHOD OF MANUFACTURE

(71) Applicant: KISMET TECHNOLOGIES LLC, Winter Park, FL (US)

(72) Inventor: Christina H. Drake, Winter Park, FL (US)

(73) Assignee: KISMET TECHNOLOGIES INC., Orlando, FL (US)

( * ) Notice: Subject to any disclaimer, the term of this patent is extended or adjusted under 35 U.S.C. 154(b) by 205 days.

(21) Appl. No.: 17/973,822

(22) Filed: Oct. 26, 2022

(65) Prior Publication Data

US 2023/0133694 A1    May 4, 2023

Related U.S. Application Data

(60) Provisional application No. 63/272,948, filed on Oct. 28, 2021.

(51) Int. Cl.
*C09D 5/14*   (2006.01)
*A01N 59/16*  (2006.01)
(Continued)

(52) U.S. Cl.
CPC ............... *C09D 5/14* (2013.01); *A01N 59/16* (2013.01); *C09D 1/04* (2013.01); *C09D 7/45* (2018.01);
(Continued)

(58) Field of Classification Search
None
See application file for complete search history.

(56) References Cited

U.S. PATENT DOCUMENTS

| 4,826,893 A | 5/1989 | Yamazaki et al. |
| 4,866,042 A | 9/1989 | Neuwelt |
| (Continued) | | |

FOREIGN PATENT DOCUMENTS

| CA | 2644315 | 10/2007 |
| CN | 101138342 | 3/2008 |
| (Continued) | | |

OTHER PUBLICATIONS

International Search Report, Feb. 7, 2023.
(Continued)

*Primary Examiner* — Alexander M Weddle
(74) *Attorney, Agent, or Firm* — Terry M. Sanks, Esq.; Beusse Sanks, PLLC (57) ABSTRACT

A touch screen display that includes a touch screen user interface having a plurality of layers that includes a top surface layer. The display includes a coating composition coating the top surface layer. The coating composition includes metal-modified cerium oxide nanoparticles (mCNPs) having a predominantly 3+ cerium surface charge and in a range of about 3-30 nm in size and in an amount that is in a range of about 1 weight percentage of a mixture having a binder and the mCNPs and m is an antimicrobial promoting metal that is non-ionizing. The touch screen display is incorporated into various machines or electronic devices. The coating composition forms a self-disinfecting surface that is optically transparent.

23 Claims, 7 Drawing Sheets
(4 of 7 Drawing Sheet(s) Filed in Color)

(51) Int. Cl.

| | | |
|---|---|---|
| *C09D 1/04* | (2006.01) | |
| *C09D 7/40* | (2018.01) | |
| *C09D 7/45* | (2018.01) | |
| *C09D 7/62* | (2018.01) | |
| *C09D 7/65* | (2018.01) | |
| *C09D 139/06* | (2006.01) | |
| *G02F 1/1333* | (2006.01) | |
| *G06F 3/041* | (2006.01) | |
| *G06F 3/044* | (2006.01) | |
| *G06F 3/045* | (2006.01) | |

(52) U.S. Cl.
CPC ............... *C09D 7/62* (2018.01); *C09D 7/65* (2018.01); *C09D 7/67* (2018.01); *C09D 139/06* (2013.01); *G02F 1/13338* (2013.01); *G06F 3/0412* (2013.01); *G06F 3/0443* (2019.05); *G06F 3/0445* (2019.05); *G06F 3/045* (2013.01); *G06F 2203/04103* (2013.01)

(56) References Cited

U.S. PATENT DOCUMENTS

| | | | |
|---|---|---|---|
| 5,223,425 | A | 6/1993 | Flier et al. |
| 5,290,552 | A | 3/1994 | Sierra et al. |
| 5,464,764 | A | 11/1995 | Capecchi et al. |
| 5,487,992 | A | 1/1996 | Capecchi et al. |
| 7,638,484 | B2 | 12/2009 | Braiman-Wilksman et al. |
| 8,400,408 | B2 | 3/2013 | Hotelling et al. |
| 8,507,431 | B2 | 8/2013 | Braiman-Wilksman et al. |
| 10,155,361 | B2 | 12/2018 | Bookbinder et al. |
| 10,289,225 | B2 | 5/2019 | Jin et al. |
| 10,642,426 | B2 | 5/2020 | Hwang et al. |
| 10,925,773 | B2 | 2/2021 | Riesinger |
| 2007/0000407 | A1 | 1/2007 | Leong |
| 2009/0130157 | A1 | 5/2009 | Ylitalo et al. |
| 2011/0038909 | A1 | 2/2011 | Roe et al. |
| 2012/0181177 | A1 | 7/2012 | Yu et al. |
| 2013/0115441 | A1 | 5/2013 | Bookbinder et al. |
| 2013/0195927 | A1 | 8/2013 | Sudipta et al. |
| 2013/0211028 | A1 | 8/2013 | Shinike et al. |
| 2016/0158403 | A1 | 6/2016 | Watson |
| 2016/0194503 | A1 | 7/2016 | Karl |
| 2017/0232139 | A1 | 8/2017 | Brownlee et al. |
| 2017/0252320 | A1 | 9/2017 | Martins-Green et al. |
| 2018/0028431 | A1 | 2/2018 | Chiattello et al. |
| 2018/0110658 | A1 | 4/2018 | Lin |
| 2018/0339913 | A1 | 11/2018 | Seal et al. |
| 2021/0030656 | A1 | 2/2021 | Liechty et al. |
| 2023/0157299 | A1* | 5/2023 | Drake ............... A01N 59/16 424/405 |

FOREIGN PATENT DOCUMENTS

| | | |
|---|---|---|
| CN | 102559138 | 11/2012 |
| WO | 2005013885 | 2/2005 |
| WO | 2017011886 | 1/2017 |
| WO | 2021222779 | 11/2021 |

OTHER PUBLICATIONS

Neal, Craig J. et al., "schemMetal-Mediated Nanoscale Cerium Oxide Inactivates Human Coronavirus and Rhinovirus, by Surface Disruption," ACS Nano, 2021, 15(9), 14544-14556. doi: 10.1021/acsnano.1c04142.

Szczesio-Wlodarczyk, A. et al., "An Evaluation of the Properties of Urethane Dimethacrylate-Based Dental Resins," Materials, 2021, 14(11):2727. https://doi.org/10.3390/ma14112727.

Xu, Z. et al., "Advances and Impact of Antioxidant Hydrogel in Chronic Wound Healing," Advanced Healthcare Materials, 2020, 9, 1901502. 10.1002/adhm.201901502.

Woodhouse, Ian et al., "Flexible Microneedle Array Patch for Chronic Wound Oxygenation and Biofilm Eradication," ACS Applied Bio Materials, 2021, 4 (7), 5405-5415. doi: 10.1021/acsabm.1c00087.

Cheng et al., "Developing a New Generation of Antimicrobial and Bioactive Dental Resins," Journal of Dental Research, 2017, vol. 96(8): 855-863, doi: 10.177/0022034517709739.

Shcherbakov et al., "CeO2 Nanoparticles-Containing Polymers for Biomedical Applications: A Review," Mar. 17, 2021, Polymers 2021, 3, 924, www.doi.org/10.3390/polym3060924.

OECD Guideline for the Testing of Chemicals No. 439, "In Vitro Skin Irritation: Reconstructed Human Epidermis Test Method," Jul. 23, 2010, OECD Publishing, Paris, https://doi.org/10.1787/9789264090958-en.

Wan, David, (2015). U.N. GHS: United Nations Globally Harmonized System of Classification and Labeling of Chemicals. CIRS. https://www.cirs-group.com/en/chemicals/un-ghs-globally-harmonized-system-of-classification-and-labeling-of-chemicals.

OECD (2021), Test No. 439: In Vitro Skin Irritation: Reconstructed Human Epidermis Test Method, OECD Guidelines for the Testing of Chemicals, Section 4, OECD Publishing, Paris, https://doi.org/10.1787/9789264242845-en.

European Commission Joint Research Centre, "Statement on the Scientific Validity of In-Vitro Tests for Skin Irritation Testing," Institute for Health and Consumer Protection In-vitro Toxicology Unit, European Centre for the Validation of Alternative Methods (ECVAM) Joint Research Centre (ESAC), Nov. 5, 2008.

OECD Guidelines for the Testing of Chemicals, Test Guideline No. 492, "Reconstructed Human Cornea-like Epithelium (RhCE) Test Method for Identifying Chemicals Not Requiring Classification and Labelling for Eye Irritation or Serious Eye Damage," Section 4, Jun. 25, 2018.

Gwak, J.H. et al., "Identifying the trends in wound-healing patents for successful investment strategies," PLoS One, 2017, 12(3): e0174203. https://doi.org/10.1371/journal.pone.0174203.

GHS: Globally Harmonized System of Classification and Labeling of Chemicals (GHS), 8th revised edition, 2019. United Nations—New York and Geneva.

Meng, Z. et al., "Therapeutic Considerations and Conjugated Polymer-Based Photosensitizers for Photodynamic Therapy," Macromolecular Rapid Communications, 2017, 1700614. doi: 10.1002/marc.201700614.

* cited by examiner

S. epidermidis growth after 2 hours

600
Positive control:
S. epidermidis on dried glass

| Plate section | CFUs/mL |
|---|---|
| 1 | $7.0 \times 10^6$ |
| 2 | $7.0 \times 10^6$ |
| 3 | $9.0 \times 10^6$ |

FIG. 6B

700
Test sample:
S. epidermidis on AgCNP2 + polyurethane

| Plate section | CFUs/mL |
|---|---|
| 1 | 0 |
| 2 | 0 |
| 3 | 0 |

ELECTRONIC DEVICE WITH SELF-DISINFECTING TOUCH SCREEN AND METHOD OF MANUFACTURE

CROSS-REFERENCE TO RELATED APPLICATIONS

This application claims priority benefit of U.S. Provisional Application No. 63/272,948, titled "ELECTRONIC DEVICE WITH SELF DISINFECTING TOUCH SCREEN AND METHOD OF MANUFACTURE," filed Oct. 28, 2021, incorporated herein by reference in its entirety.

BACKGROUND

Embodiments relate to the field of electronic devices, more specifically, the field of electronic devices with touch sensitive display screens.

Touch screen electronic devices have become ubiquitous for collecting information about patients, customers and workers at places like hospitals, restaurants, hotels, schools, retail stores, etc. Touch screens can be difficult to disinfect because common disinfection methods have drawbacks. For example, solvent based disinfectants can destroy the touch screen and associated electronics of the device if too much liquid gets under the top layer. Another disinfecting process may use ultraviolet (UV) light disinfection with the illumination of UV light. UV disinfection processes require that electronic device be pulled out of use for some time period to illuminate the touch screen display of the electronic device with an amount of UV light.

Both the solvent-based disinfectant and UV light disinfection processes have a common drawback. These disinfectant processes require repeated application of the disinfectant medium. Most solvent-based disinfectants and UV light disinfection processes may render the surface disinfected, but essentially only until the next use by a user or consumer. After each use, the disinfected surface can become re-contaminated. For example, the touch screen surface may also become re-contaminated by a nearby person sneezing or coughing. This releases and propels air with nasal or mouth fluid sprays, carrying bacteria and/or a virus, in the direction of the touch screen. As a consequence, the current methods to disinfect touch screens require reapplication of the disinfectant medium, whether UV light or a fluid, as the touch screens are used throughout the day, which still creates the chance of spreading contaminants including viruses and bacteria.

A solvent-based disinfectant product by MICROBAN™ claims to prevent the spread and growth of bacteria for 24 hours. However, the disinfectant still needs to be reapplied to the surface after 24 hours and still may harm the electronics.

SUMMARY

An aspect of the embodiments includes a touch screen display that includes a touch screen layer stack having a plurality of layers that includes a top surface layer. The display includes a coating composition coating the top surface layer. The coating composition includes metal-modified cerium oxide nanoparticles (mCNPs) having a predominantly 3+ cerium surface charge and in a range of about 3-30 nm in size and in an amount that is in a range of about 1 weight percentage of a mixture having a binder and the mCNPs where m is an antimicrobial promoting metal that is non-ionizing.

An aspect of the embodiments includes an electronic device that includes electronic circuitry. The electronic device also includes a touch screen display interfaced with the electronic circuitry.

An aspect of the embodiments includes a method of forming a touch screen display. The method includes providing the touch screen layer stack that includes a top surface layer. The method includes forming a coating composition. The coating composition comprises metal-modified cerium oxide nanoparticles (mCNPs) having a predominantly 3+ cerium surface charge and in a range of about 3-30 nm in size and in an amount that is in a range of about 1 weight percentage of a mixture having a binder and the mCNPs where m is an antimicrobial promoting metal that is non-ionizing. The method includes coating the top surface layer while forming the coating composition that forms a self-disinfecting surface that is optically transparent.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

The inventor has surprisingly determined that metal-modified cerium oxide nanoparticles (mCNPs), as described herein, may be applied to a top layer of touch screens to create a self-disinfecting surface that remains optically transparent and does not interfere with the resistive or capacitive elements such as made of one of indium tin oxide (ITO), antimony tin oxide (ATO) and conductive clear polymer directly beneath the top layer, for example.

The inventor has determined that the mCNPs, as described herein, can be applied to many forms of touch screen surfaces to locally create a self-disinfecting surface that remains optically transparent when presented with bacteria or viruses, killing them and preventing further proliferation. Accordingly, the coating composition is self-disinfecting surface that is optically transparent.

The inventor has determined that a unique feature of the metal-modified nanoceria, described herein, has the ability for the nanoparticles to be "rechallenged" by a new load of bacteria and viruses, including tough to kill bacteria and viruses. This disinfection is achieved even when a prior disinfected load is still present on the surface of the touchscreen, i.e., even with a soil or carbonaceous load present on the top layer of the touchscreen. This is an important distinction in disinfection activity since many nanoparticle-based disinfection techniques require direct contact with a virus or bacteria in order to achieve disinfection. Soil and carbonaceous load often interfere with the activity of disinfection.

The mCNPs, described herein, possess Super Oxide Dismutase (SOD) activity common to many bio-safe forms of nanoceria. Unlike other nanoceria, the "switch-over" reactions on the nanoceria surface are made fast and more potent by the small presence of discrete silver on the surface of the nanoceria. This allows for quick and facile change in surface behavior of the nanoceria between creation of oxidizing species that are harmful to viruses and bacteria, and to free radical scavenging behavior (antioxidant behavior) that is beneficial to healthy cells. This allows for disinfection of viruses and bacteria in under an hour when incorporated into the top layer of a typical touch screen (glass or polymer), while not interfering with the resistive or capacitive response in the immediate layers below the top surface layer. The amount of the metal-modified nanoceria, described herein, needed to achieve disinfection is well below 1 weight % and maintains optical transparency when incorporated into glass and/or polymer. The amount of the metal-modified nanoceria, described herein, needed to achieve disinfection may be about 0.05-0.99 weight %.

Definitions

Unless specifically stated or obvious from context, as used herein, the term "about" is understood as within a range of normal tolerance in the art, for example within 2 standard deviations of the mean. "About" can be understood as within 30%, 25%, 20%, 15%, 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "composition" or "composite" refers to a product that includes ingredients such as one or more of chemical elements, excipient, diluent, binder or constituent in specified amounts, in addition to any product which results, whether directly or indirectly, from a combination of the ingredients in the specified amounts.

The term "disinfection" or "disinfect," as used herein, refers to a reduction or elimination of pathogenic microorganisms on surfaces including bacteria and viruses.

The term "rapid disinfection," as used herein, refers to a short time frame for elimination of a pathogenic microorganism on surfaces.

The term "self-disinfecting surface," as used herein, refers to the autonomous elimination of a pathogenic microorganism of the surface of a commercially-off-the-shelf product or surface and without use of an application of another disinfectant medium.

As used herein, the terms "subject," "individual" or "patient" refer to a human, a mammal or an animal.

The term "metal-modified cerium oxide nanoparticles," "metal-modified ceria nanoparticles" or "mCNPs," as used herein, refers to cerium oxide nanoparticles coated with or otherwise bound to an antimicrobial promoting metal such as silver, gold, copper, platinum, nickel, iron, titanium, ruthenium, vanadium, zinc, and the like. The term "mCNPs" includes AgCNP2, as described herein, with particles sizes in a range of about 3-35 nm. In an embodiment, the metal-associated cerium oxide nanoparticles comprise a particle size in the range of from 1 nm to 10 nm with the preferred range of about 3-30 nm. The metal is a stable metallic metal that is non-ionizing (i.e., a non-ionic metal) with antimicrobial promoting properties.

As sometimes used herein, cerium oxide nanoparticles are referred to as "nanoceria." The mCNP ingredient described herein is a Rapid and Residual Acting Disinfectant (RAD) with nanoparticles, hereinafter referred to as "NanoRAD."

The inventor has determined that AgCNP1 is catalase mimetic.

The AgCNP1 and AgCNP2 are enzyme mimetic non-stoichiometric nano-cerium oxide. The silver of the synthesis for AgCNP1 and AgCNP2 is a stable metallic silver that is non-ionizing. While not wishing to be bound by theory, the synthesis makes it so that a few atomic layers of the stable metallic silver is anchored into the cerium oxide and contributes to cerium oxide activity (+3 and super oxide dismutase), as opposed to be the direct antimicrobial.

The term "predominant 4+ surface charge" refers to the concentration of cerium ions on the surface and means that the [Ce3+]:[Ce4+] ratio on the surface of the ceriumoxide nanoparticle is less than 50%. In a specific example, cerium oxide nanoparticles having a predominant 4+ surface charge have a [Ce3+]:[Ce4+] ratio that is 40% or less.

The term "predominant 3+ surface charge" means that the [Ce3+]:[Ce4+] ratio on the surface of the cerium oxide nanoparticle is greater than 50%. In a specific example, the [Ce3+]:[Ce4+] ratio is greater than 54%.

Overview

Hospital Acquired Infections (HAIs) affect more than 1 in 30 patients in the U.S. HAIs are often caused by bacteria and viruses that are spread onto different surfaces, often by healthcare worker's hands. Surface disinfection becomes important to stop the spread of illness in places where a lot of bacteria and viruses can proliferate. In hospitals, it is becoming more common for touch screen computers and tablets to be how patient information is conveyed and archived for doctors and nurses. Often, no hand washing occurs between a healthcare worker's interaction with the touch screen and interaction with the patient. This leaves touch screens as a critical vector in spreading HAI causing viruses and bacteria between patients.

Touch screens are incorporated in many machines including machines used for self-check-in at a hospital or emergency room. Touch screens are incorporated into facsimile machines, X-ray machines, surgical robotic machines, blood pressure and temperature recording machines, to name a few, as touch screens are a user interface to operate the machines and record data from the machines to update and populate patient files electronically. For approximately the last 15 years, electronics have replaced pen and paper as the main method of collecting patient or user information.

In retail stores, machines with touch screens are used at the point-of-sale (POS) to pay a cashier. Other touch screen devices are used to look-up a product. POS machines are readily found in just about every store, business, doctor's office and hospital for the collection of a payment.

Nanoparticle films exist on the market claiming to be "self-cleaning," but are not effectively self-disinfecting between uses which is required to remove common HAI viruses and bacteria. Most nano-oxide based disinfection approaches suffer from slow disinfection kinetics making them ineffective as a disinfectant that effectively deactivates viruses and bacteria between people using an item such as a touch screen. Metal-based nanoparticle disinfectants (such as, nano-silver) degrade optical transparency and can leach metal ions, disrupting the function of the underlying capacitive and resistive element below the top layer.

Metal-Modified Cerium Oxide Nanoparticle (AgCNP2)

Metal-modified nanoceria (AgCNP2) has fast disinfection surface reactions making timely disinfection possible, and the metal bi-phase on the nanoceria surface is stable and does not leech metal ions from the metal bi-phase.

Using a forced hydrolysis reaction, a solution containing silver-modified nanoceria and silver secondary phases were formed, hereinafter referred to as "material." The material was washed with distilled water. Then, the washed material was treated with ammonium hydroxide ($NH_4OH$). The material was also treated with a phase transfer complex: mediating aqueous dispersion of dissolved silver, (Ag $[(NH_3)_2OH]_{aq}$). After treatment, the treated material was washing again such as by distilled water. Silver nitrate ($AgNO_3$) and cerium (Ce) are dissolved to form a mixture. Then the mixture is dissolved by hydrogen peroxide ($H_2O_2$) which causes selective oxidation of $Ce^{3+}$ over silver and the evolution of metallic silver phases on the ceria surface. The formula properties for AgCNP2 is shown below in Table 1.

TABLE 1

| | AgCNP2 | Inorganic Crystal Structure Database No. (ICSD #) |
|---|---|---|
| $Ce^{3+}$:$Ce^{4+}$ (% $Ce^{3+}$)(%) | 53.7 | |
| [Ag]/Ag+Ce] by XPS(%) | 14.6 | |
| SOD Activity (% Inhibition) | 99.2 | |
| Hydrodynamic Diameter (nm) | 31.6 ± 2.4 | |
| Zeta Potential (mV) | 24.1 ± 1.3 | |
| ICPMS Ce concentration (ppb) | 299.2 ± 1.3 | |
| $E_{corr}$ (mV) | 217.374 | |
| Metallic Ag | | 44387 |
| $CeO_2$ | | 55284 |

A process for metal-mediated nanoscale cerium oxide is described in Craig J. Neal et al., titled "schemMetal-Mediated Nanoscale Cerium Oxide Inactivates Human Coronavirus and Rhinovirus by Surface Disruption," ACS Publications, ACSJCA 8/23/2021, doi.org/10.1021/acsnano.1c04142, incorporated herein by reference in its entirety.

A Zeta-sizer nano was used from Malvern Instruments to determine hydrodynamic diameters and zeta potentials. Tafel analysis for AgCNP2 shows distinct corrosion potentials. $E_{corr}$ values are substantially more noble than pure silver.

A more detailed description of the process for forming AgCNP2 will now be described. First, about 109 mg of cerium nitrate hexa-hydrate (99.999% purity) is dissolved in about 47.75 mL $dH_2O$ in a 50 ml square glass bottom. Then, about 250 µL of 0.2 M aq. $AgNO_3$ (99% purity) is added to the cerium solution above with the solution vortexed for 2 minutes: Machine: Vortexer. Then, about 2 mL of 3% hydrogen peroxide (stock) is added quickly to the above solution followed by immediate vortexing for 2 minutes at highest rotation speed (in vortexer machine). This solution is stored in dark condition at room temperature with the bottle (50 mL square bottom glass) cap loose to allow for release of evolved gases; solutions are left to age in these conditions for up to 3 weeks (monitoring solution color change from yellow to clear) to create 50 ml total volume of the solution. Particles are then dialyzed against 2 liters of $dH_2O$ over 2 days, (dialysis tubing) with the water changed every 12 hours and stored in the same conditions for ageing.

The two unique formulations of cerium oxide nanoparticles are produced with surfaces modified by silver nanophases. Materials characterization shows that the silver components in each formulation are unique from each other and decorate the ceria surface as many small nanocrystals (AgCNP1) or as a Janus-type two-phase construct (AgCNP2). The average diameter of AgCNP1 is about 20 to 24 nm, and the average diameter of AgCNP2 is about 3 to 30 nm. However, the inventor prefers the use of AgCNP2, for the reasons stated below.

Each synthesis further possesses unique mixed valency with AgCNP2 possessing a significantly greater fraction of $Ce^{3+}$ states relative to $Ce^{4+}$ over AgCNP1. The distinct valence characters, along with incorporation of chemically active silver phases, lead to high catalytic activities for each formulation. AgCNP2 possesses high superoxide dismutase activity, while AgCNP1 possesses both catalase and superoxide dismutase-like enzyme-mimetic activities, ascribed to the catalase activity of ceria and the superoxide dismutase activity from silver phases.

Further, analysis demonstrates that silver incorporated in each formulation is substantially more stable to redoxmediated degradation than pure silver phases: promoting an increased lifetime in catalytic applications.

Use of AgCNP2 formulation in effecting antimicrobial properties showed specific activity in tests associated with bacteria, with, among bacteria species tested, AgCNP2 showing substantial activity towards *staphylococcus* mutants such as *Staphylococcus aureus*. *Staphylococcus* mutants include a family of bacteria found in the mouth or oral cavity and can be released from a subject by coughing or sneezing, for example. *Staphylococcus* mutants are also found in the respiratory track and human skin.

Although the amount is not intended to be limiting, when used in methods of the invention, some preferred amounts of silver percentages associated with the AgCNPs are about 8% to 15% or less.

In other embodiments, disclosed is a method of producing mCNP, as described herein, which may include the metal of silver. Further, the AgCNP2 is produced via a method comprising dissolving cerium and silver precursor salts such as cerium and silver nitrates; oxidizing the dissolved cerium and silver precursor salts via admixture with peroxide; and precipitating nanoparticles by subjecting the admixture with ammonium hydroxide.

Alternatively, the AgCNP are produced via a method comprising (i) dissolving cerium and silver precursor salts such as cerium and silver nitrates; (ii) oxidizing and precipitating the dissolved cerium and silver precursor salts via admixture with ammonium hydroxide; (iii) washing and resuspending precipitated nanoparticles in water; (iv) subjecting the resuspended nanoparticles with hydrogen peroxide; and (v) washing the nanoparticles from step (iv) to remove ionized silver. The resultant metal (m) in the mCNP ingredient is a non-ionic metal with antimicrobial promoting properties.

Applications

The metal-modified nanoceria, such as AgCNP2, allows for facile incorporation of a self-disinfecting material into a glass or polymer without degrading optical transparency and not interfering with the electrical function of the resistive or capacitive layer below the top layer. The resistive or capacity layers are those found in touch technology such as touch sensitive screens. The resistive or capacity layers may be made of indium-type oxides such as, without limitations, ITO, tin-doped indium oxide, indium zinc oxide, indium gallium zinc oxides, etc. The resistive or capacity layers may be made of other composites such as ATO or a conductive clear polymer.

Resistive or capacitive elements or layers may include a metal such as silver (Ab), gold (Au), copper (Cu), magnesium (Mg), aluminum (Al), molybdenum (Mo), neodymium (Nd), nickel (Ni), tin (Sn) titanium (Ti), zirconium (Zr), vanadium (V), palladium (Pd), and alloys thereof.

Touch screens may be integrated with a liquid crystal display (LCD) device or a light emitting diode (LED) display device. The display device may be an organic light-emitting diode (OLED) display device, a quantum dot display (QLED) device, a liquid crystal on silicon (LCoS) display device, etc. An example electronic device with a touch screen display will be described in relation to FIG. 1.

Figure 1:
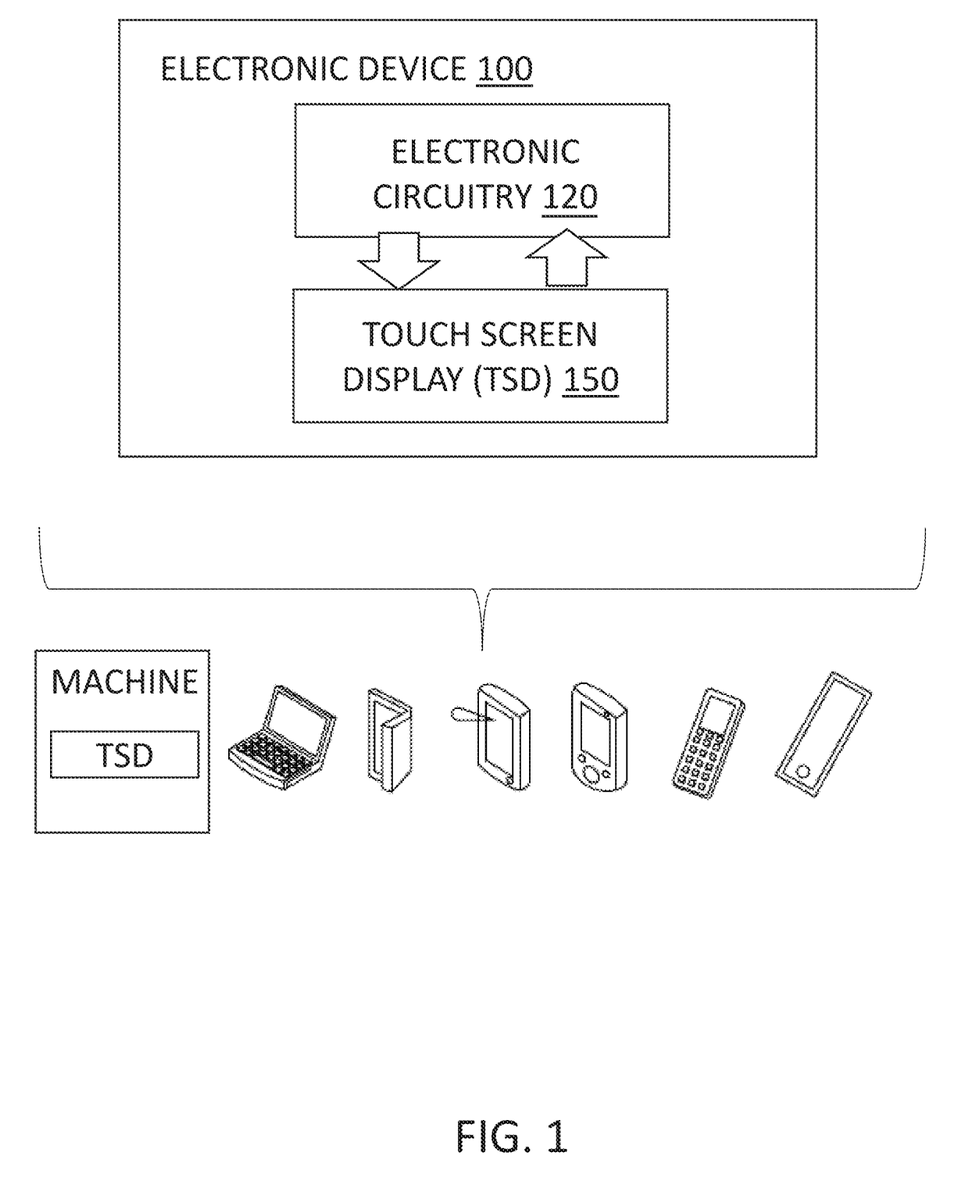
FIG. 1 illustrates an electronic device according to an embodiment.

FIG. 1 illustrates an electronic device 100 that includes electronic circuitry 120 and a touch screen display (TSD) 150. The electronic device 100 may include computing devices such as a computer with a TSD connected to the computer either wired or wirelessly. The electronic device 100 may include a Tablet, Notebook, a smartphone, mobile phone, satellite phone, cellular phone, a hand-held device, remote data terminal, iPAD, or the like. The electronic device 100 may include any type of electronic machine that uses a touch screen display such as, without limitation, as a user interface. The electronic machine may include a camera device, a printer device, a facsimile device, office equipment, retail equipment, point-of-sale terminals, hospital equipment, medical equipment, automotive repair equipment, vehicle display devices, aircraft display devices, remote controls, stand-alone display devices, additive manufacturing machines, autonomous machines, etc. As can be seen from the description herein, the types of machines are enumerable, but to list each and every electronic machine that includes a touch screen user interface herein is prohibitive.

Figure 2:
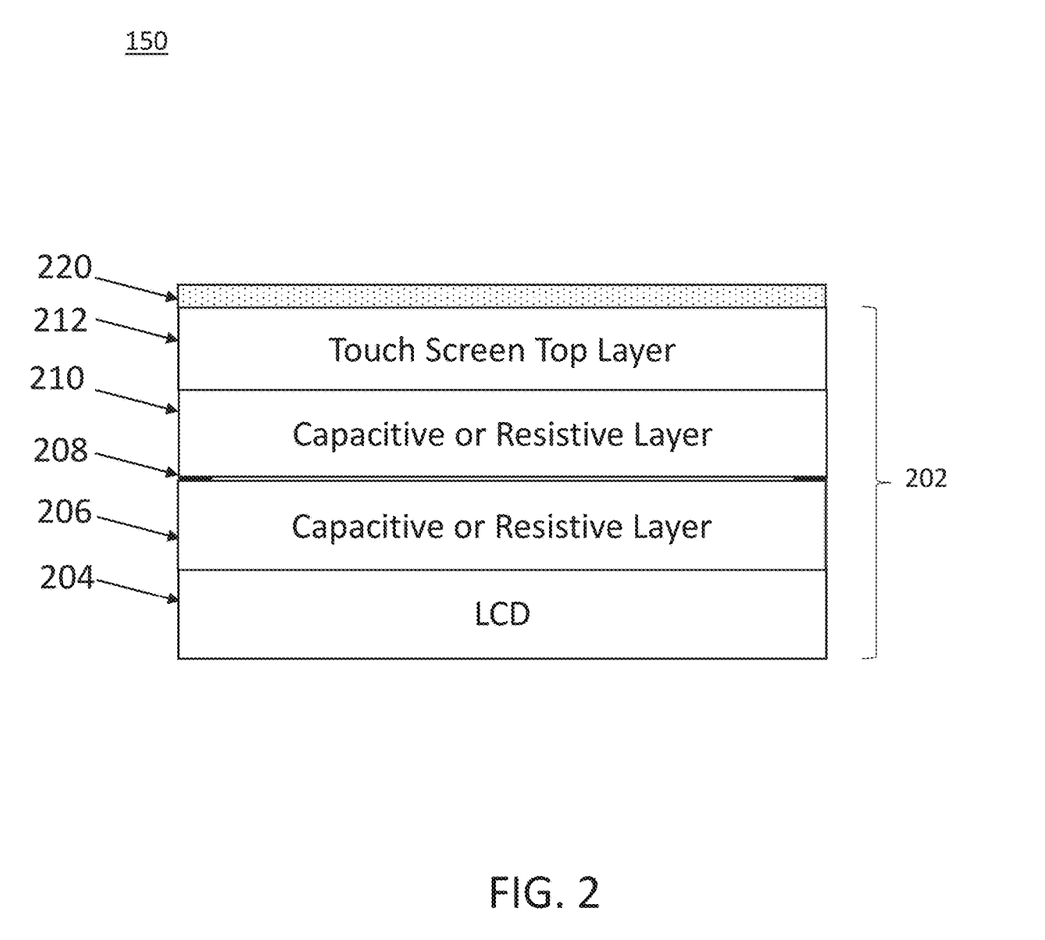
FIG. 2 illustrates a cross-sectional view of a touch screen.

FIG. 2 illustrates a cross-sectional view of a touch screen 200 for a touch screen display 150 (FIG. 1) according to an embodiment. The touch screen 200 may include a liquid crystal display (LCD) layer 204. The LCD layer 204 may include a liquid crystal cells sub-layer, for example. The LCD layer 204 may include other sub-layers such as, without limitation, a plurality of sub-layers that include a fluorescent panel, polarization filter(s) and/or color filters (red, green, blue).

The touch screen 200 may include a touch screen layer stack 202 with one or more capacitive or resistive layers 206 and 210 above the LCD layer 204, for example. The layer 204 may include a plurality of layers. In this example, between layer 206 and layer 210, electrode layer 208 may be provided. The capacitive or resistive layer(s) 206, 210 may include transparent conductive oxide (TCO) material made from ITO, ATO, or a conductive clear polymer. An example, touch screen is described in U.S. Pat. No. 8,400,408, entitled "Touch Screens with Transparent Conductive Material Resistors," assigned to Apple Inc., which is incorporated herein by reference in entirety.

The transparent conductive oxide material is made from indium zinc oxide (IZO).

The touch screen layer stack 202 may include a top layer 212 on top of the one or more capacitive or resistive layers 206 and 210. In this example, the touch screen 200 includes capacitive or resistive layer 206 above the LCD layer 204, electrode layer 208 followed by a capacitive or resistive layer 210. The touch screen layer stack 202 includes a touch screen top layer 212 above the capacitive or resistive layer 210. Although the touch screen layer stack 202 includes an LCD layer 204, the LCD layer 204 may be substituted with an LED layer that incorporates types of light-emitting diode technology or LCoS technology. For example, the LCD layer 204 may be substituted with organic light-emitting elements.

Each layer of the touch screen 200 may include sub-layers. Furthermore, the touch screen 200 may include other layers not described herein based on the touch screen design.

The touch screen top layer 212 may be a protective cover such that the capacitive or resistive layer(s) 206 and 210 are sandwiched between the top layer 212 and the lower LCD layer 204. The top layer 212 may be made of glass or other transparent protective polymer.

Touch screen may include mutual-capacitive touch panels formed from rows and columns of traces on opposite sides of a dielectric. At the "intersections" of the traces, where the traces pass above and below each other (but do not make direct electrical contact with each other), the traces essentially form two electrodes with a mutual capacitance therebetween.

The touch screen 200 may include a nanoparticle coating 220, denoted with dotted hatching, having a coating composition of AgCNP2 having a predominantly 3+ cerium surface charge and a binder suitable for glass and which maintains transparency. The coating 220 having the AgCNP2 may be bonded to the external side of the top layer 212, where the AgCNP2 may be combined with a binder configured to cause nanoparticles to adhere to a glass surface or glass ceramic surface, such as a top layer of a touch screen surface, to coat the glass surface. The coating may have a thickness in the range of 0.55 to 1.8 millimeters (mm).

An example binder is described in U.S. Pat. No. 10,155,361, entitled "Method of Binding Nanoparticles to Glass," assigned to Corning Incorporated, which is incorporated herein by reference in entirety.

The coating composition may include a dispersant additive to assist with AgCNP2 mixing. An example dispersant additive includes DISPERBYK-2081, manufactured by BYK-Chemie GmbH, Germany, or a solution of polycarboxylic acid salt. An example dispersant additive includes DISPERBYK-2019, manufactured by BYK-Chemie GmbH, Germany, or a solution of a copolymer with pigment-affinic groups. Recommended levels of the DISPERBYK-2019 additive is 20-60% for transparent iron oxides; 5-40% for inorganic pigments; and 6-8% for titanium dioxide. An example dispersant additive includes BORCHI Gen 1750, manufactured by Borchers, or high molecular weight, volatile organic compound (VOC) free wetting and dispersing agent. Recommended levels of the BORCHI Gen 1750 additive is 50-70% in a mixture including transparent iron oxide; 4-8% in a mixture including titanium dioxide. An example dispersant additive includes BORCHI Gen 12, manufactured by Borchers or low molecular weight nonionic, alkyl phenol ethoxylates (APEO)- and VOC-free dispersant. Recommended levels of the BORCHI Gen 12 additive is 1-3% in an (oxide) based mixture including titanium dioxide.

The touch screen 200 may include a support element such as glass, glass ceramic, or the like, a binder and a nanoparticulate layer of AgCNP2 to provide a nanotextured glass surface that has high durability and is ion exchangeable to impart mechanical strength as well as self-disinfecting properties.

The binder may include an alkali silicate, borate or phosphate. In some embodiments, alkali silicate comprises $SiO_2$ and $Alk_2O$, wherein Alk comprises Li, Na or K at a ratio from about 0.05:1 to about 20.0:1 $SiO_2$:$Alk_2O$.

In some embodiments, alkali borate comprises $R(H_n Alk_2O) \cdot B_2O_3$, n=0 to <2, wherein R is about 0.05 to about 20.0 and Alk comprises Li, Na or K at a ratio from about 0.05:1 to about 20.0:1 $SiO_2$:$R(H_n Alk_2O) \cdot B_2O_3$.

In some embodiments, the binder comprises $SiO_2$ and $H_n Alk_{3-n} PO_4$, wherein n=0 to <3 and Alk comprises Li, Na, or K, at a ratio from about 0.05:1 to about 20.0:1 $SiO_2$:$H_n Alk_{3-n} PO_4$.

In some embodiments, the binder comprises $SiO_2$ at a weight percent from about 0.1 to about 40.0.

In some embodiments, the binder is heat-treated to remove water and to form a glass layer or coating.

The binder may be applied by dip coating, spin coating, slot coating, sputtering, DC magnetron sputtering, and various deposition processes. The deposition processes may include vapor deposition, chemical deposition, spray deposition, direct nanoparticle deposition, etc.

In some embodiments, the thickness of the binder comprises less than about one-quarter average diameter or one-half average diameter or the average diameter of said nanoparticles.

The binder may be a binder commonly used to incorporate nanoparticles into ITO such as polyvinyl pyrrolidone (PVP). The dispersant additive or binder themselves may be able to achieve good mixing and homogeneity separately or together, but is based on the specific manufacturing technique.

In some embodiments, an electronic device 100 or machine is provided that includes electronic circuitry 120; and a touch screen user interface (e.g., touch screen display 150) interfaced with the electronic circuitry, the touch screen user interface includes a top surface layer coated with a coating composition comprising metal-modified cerium oxide nanoparticles (mCNPs) having a predominantly 3+ cerium surface charge and in a range of about 3-30 nm in size and in an amount that is in a range of 1 weight percentage of a mixture having a binder and the mCNPs.

In view of the foregoing, the embodiments herein are directed to an electronic device with electronic circuitry and a touch-sensitive user interface including a touch screen having a top surface layer and a coating including a coating composition that includes metal-modified cerium oxide nanoparticles (mCNPs) having a predominantly 3+ cerium surface charge and, as described herein, bonded to the top surface layer, the mCNPs are in the range of 3 nm to 30 nm.

In some embodiments, the touch screen may be integrated with stack layers of a liquid crystal display (LCD) or a light emitting diode (LED) display. The display may be an organic light-emitting diode (OLED) display, a quantum dot display (QLED, or a liquid crystal on silicon (LCoS) display.

In some embodiments, a touch screen display device is provided having a self-disinfecting top surface layer comprising a glass coated surface coated with a coating composition comprising metal-modified cerium oxide nanoparticles (mCNPs) having a predominantly 3+ cerium surface charge and in a range of about 3-30 nm in size and in an amount that is in a range of 1 weight percentage of a mixture having a binder and the mCNPs.

In some embodiments, a top surface layer of a touch screen is provided that is a self-disinfecting top surface layer comprising a glass coated surface coated with a coating composition comprising metal-modified cerium oxide nanoparticles (mCNPs) having a predominantly 3+ cerium surface charge and in a range of about 3-30 nm in size and in an amount that is in a range of 1 weight percentage of a mixture having a binder and the mCNPs.

In some embodiments, the binder may be applied to the glass surface to coat the surface by dip coating, spin coating, slot coating, sputtering, DC magnetron sputtering, or various deposition processes. The deposition processes may include vapor deposition, chemical deposition, spray deposition and direct nanoparticle deposition.

The metal-modified cerium oxide nanoparticles of the coating composition may include a metal is selected from the group consisting of silver, gold, ruthenium, vanadium, copper, titanium, nickel, platinum, titanium, tin, zinc and iron. The metal may be an antimicrobial promoting metal that is non-ionizing meaning the metal is a non-ionic metal.

In some embodiments, the metal of the metal-modified cerium oxide nanoparticles comprises AgCNP2 in an amount of about 1% by weight in the coating composition. The amount may be 0.05-0.99 weight %.

The metal-modified cerium oxide nanoparticles of the coating composition may comprise a predominantly 3+ surface charge.

Moreover, the method may include forming a coating for a top surface layer of a touch screen, and/or a coating composition including the mCNPs in an amount of about 1% by weight in the coating composition where the mCNPs in the composition are in the range of about 3-30 nm in size. The amount may be about 0.05-0.99 weight %.

In some embodiments, the AgCNP2 of the coating composition for bonding to a touch screen is produced via a method comprising dissolving cerium and silver precursor salts such as cerium and silver nitrates and oxidizing the dissolved cerium and silver precursor salts.

In some embodiments, the AgCNP2 of the coating composition for bonding to a touch screen may be produced via a method comprising dissolving cerium and silver precursor salts such ascerium and silver nitrates; oxidizing the dissolved cerium and silver precursor salts via admixture with peroxide; and precipitating nanoparticles by subjecting the admixture with ammonium hydroxide.

In some embodiments, the AgCNP2 of the coating composition is produced via a method comprising (i) dissolving cerium and silver precursor salts such as cerium and silver nitrates; (ii) oxidizing and precipitating the dissolved cerium and silver precursor salts via admixture with ammonium hydroxide; (iii) washing and resuspending precipitated nanoparticles in water; (iv) subjecting the resuspended nanoparticles with hydrogen peroxide; and (v) washing the nanoparticles from step (iv) to remove ionized silver where the mCNPs in the coating composition are in the range of about 3-30 nm in size. The mCNPs of the composition may be in the range of about 3-35 nm in size.

In some embodiments, a method of disinfecting a touch screen surface includes coating the touch screen surface with a self-disinfecting nanoparticle coating composition including metal-modified cerium oxide nanoparticles (mCNP), as described herein, and a binder where the mCNPs in the coating composition are in the range of about 3-30 nm in size and about 1 weight percentage.

Figure 3A:
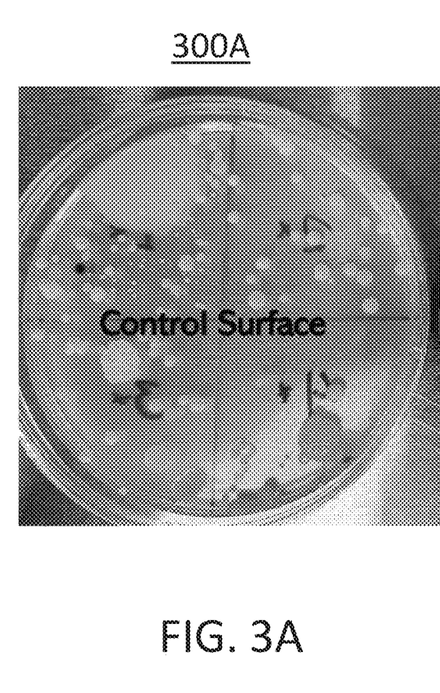
FIG. 3A illustrates a photograph of a control surface in a pediatric facility that was not cleaned, and after 28 days *P. aeruginosa, K. pneumoniae* and *S. aureus* are present on the surface.

FIG. 3A illustrates a photograph of a control surface in a pediatric facility that was not cleaned, and after 28 days *P. aeruginosa*, *K. pneumoniae* and *S. aureus* are present on the surface.

Figure 3B:
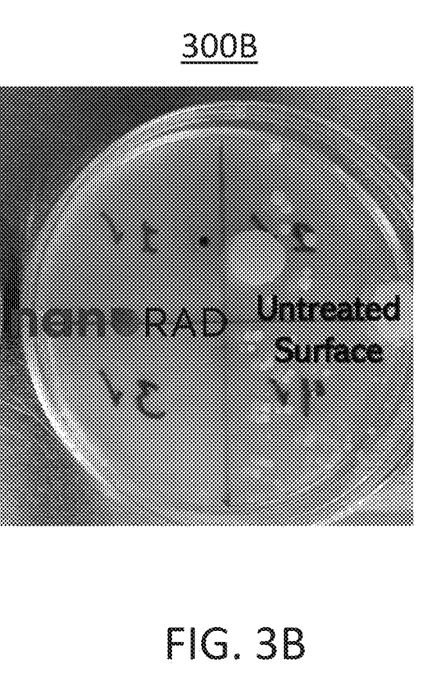
FIG. 3B illustrates a photograph of an AgCNP2 with a binder treated surface (<0.1 weight %) ("NanoRAD") and the untreated surface, where neither were cleaned for 28 days, where the NanoRAD treated surface prevented bacteria survival for 28 days, and the untreated surface matched the control surface.

FIG. 3B illustrates a photograph of an AgCNP2 with binder treated surface (<0.1 weight %) ("NanoRAD") and the untreated surface, where neither were cleaned for 28 days, where the NanoRAD treated surface prevented bacteria survival for 28 days, and the untreated surface matched the control surface.

Figure 4:
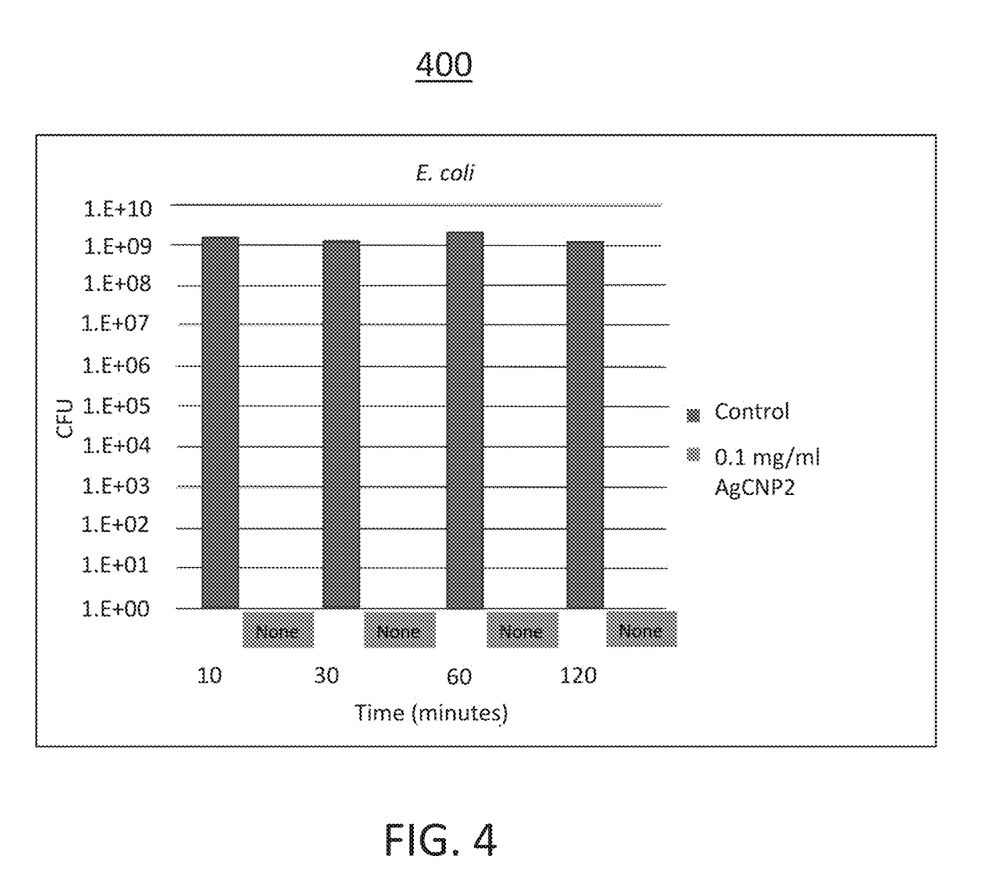
FIG. 4 illustrates a graphical representation of efficacy tests of AgCNP2 (NanoRAD) at different incubation times of 10, 30, 60 and 120 minutes with *Escherichia coli*.

FIG. 4 illustrates a graphical representation 400 of efficacy tests of AgCNP (NanoRAD) at different incubation times with *Escherichia coli*. The efficacy tests were evaluated at times 10, 30, 60 and 120 minutes to measure the colony-forming unit (CFU). No bacterial survival at any time point was noted between 10 minutes to 120 minutes for the NanoRAD of AgCNP2 with an AgCNP2 of 0.1 mg/ml or <0.01 weight % for the challenge.

Figure 5:
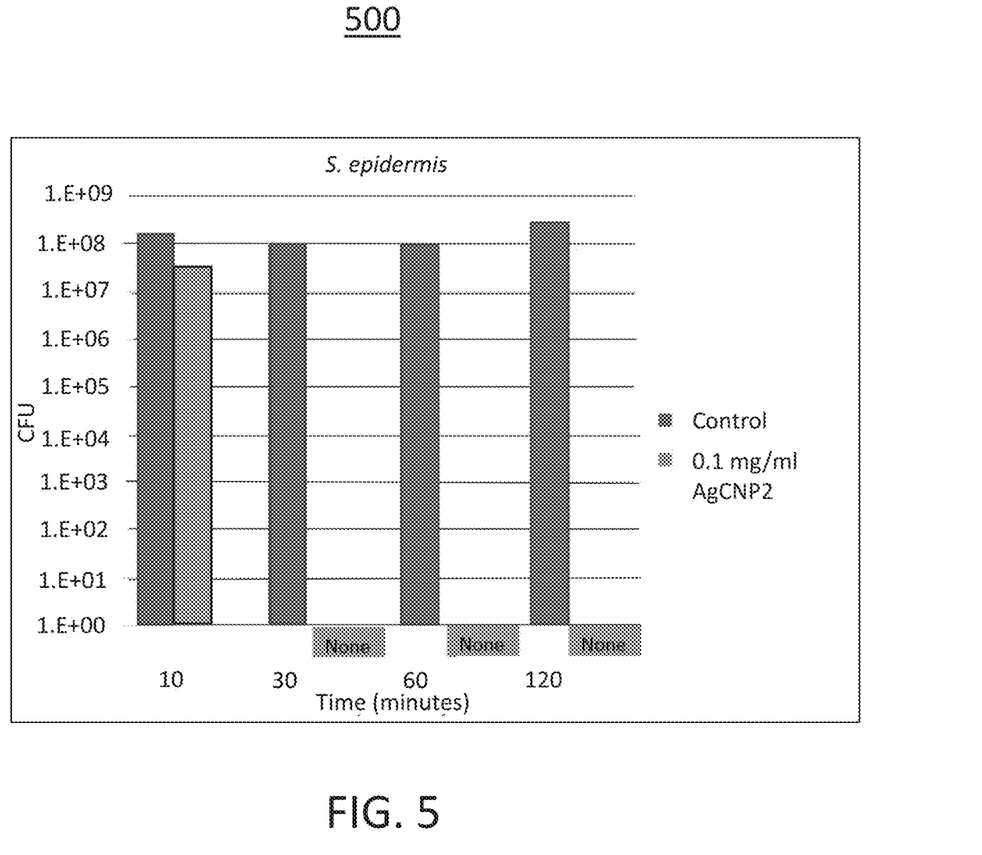
FIG. 5 illustrates a graphical representation of efficacy tests of AgCNP2 (NanoRAD) at different incubation times of 10, 30, 60 and 120 minutes with *Staphylococcus epidermidis*.

FIG. 5 illustrates a graphical representation of efficacy tests of AgCNP (NanoRAD) at different incubation times with *Staphylococcus epidermidis*. The efficacy tests were conducted at 10, 30, 60 and 120 minutes. The efficacy tests of a control substance are represented in a blue bar at 10, 30, 60 and 120 minutes. The efficacy test of the AgCNP2 evaluated at time=10 minutes is shown in an orange bar. The efficacy tests of the AgCNP2 at times 30, 60 and 120 minutes was essentially 0 with an AgCNP2 of 0.1 mg/ml or <0.01 weight % for the challenge.

Figure 6A:
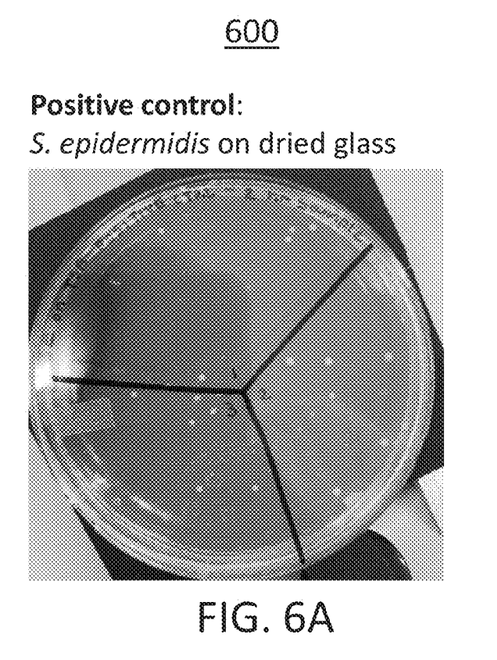
FIG. 6A illustrates a photograph of *S. epidermidis* dried on glass and treated with a positive control medium in three separate areas/sections 1, 2 and 3.
Figure 6B:
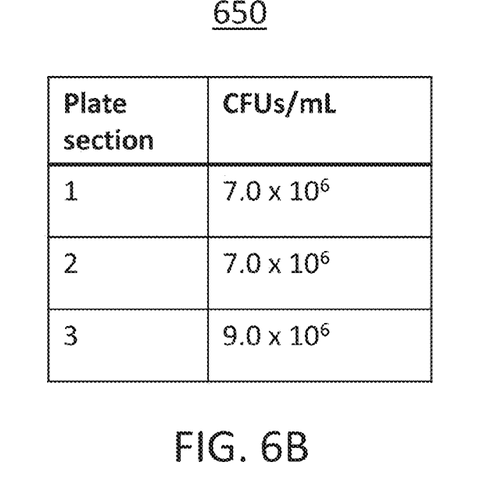
FIG. 6B illustrates a table of results over 2 hours of the *S. epidermidis* dried on the glass in areas/sections 1, 2 and 3.

FIG. 6A illustrates a photograph 600 of *S. epidermidis* dried on glass, compatible as a touch screen base, and treated with a positive control medium in three separate areas/sections 1, 2 and 3. FIG. 6B illustrates a table 650 of test results over two hours of the *S. epidermidis* dried on the glass in areas/sections 1, 2, and 3. The CFUs/mL in plate sections 1 and 2 were found to be $7.0 \times 10^6$ after two hours. The CFUs/mL in plate section 3 was found to be $9.0 \times 10^6$ after two hours.

Figure 7A:
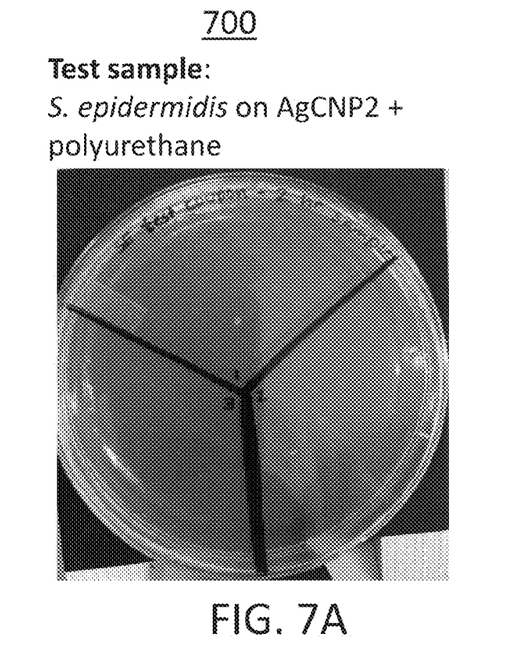
FIG. 7A illustrates a photograph of *S. epidermidis* dried on glass coated with AgCNP2 and polyurethane in three separate areas/sections 1, 2 and 3.
Figure 7B:
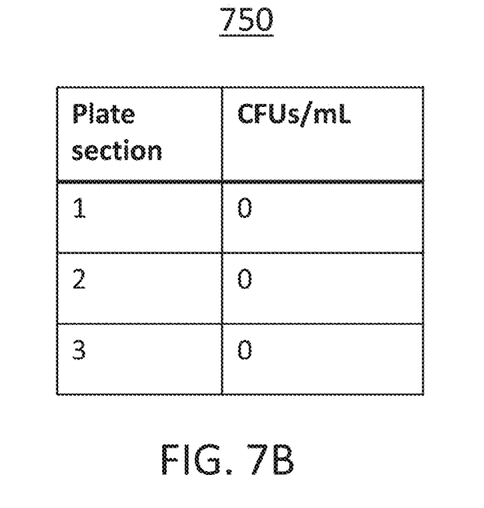
FIG. 7B illustrates a table of results over 2 hours of the *S. epidermidis* dried on the glass coated with AgCNP2 and polyurethane in three separate areas/sections 1, 2 and 3.

FIG. 7A illustrates a photograph 700 of *S. epidermidis* dried on glass, compatible as a touch screen base, coated with AgCNP2 and polyurethane in three separate areas/sections 1, 2 and 3. FIG. 7B illustrates a table 750 of test results over 2 hours of the *S. epidermidis* dried on the glass coated with AgCNP2 and polyurethane in three separate areas/sections 1, 2 and 3. The CFUs/mL in plate sections 1, 2 and 3 were found to be essentially 0 after 2 hours.

Figure 8:
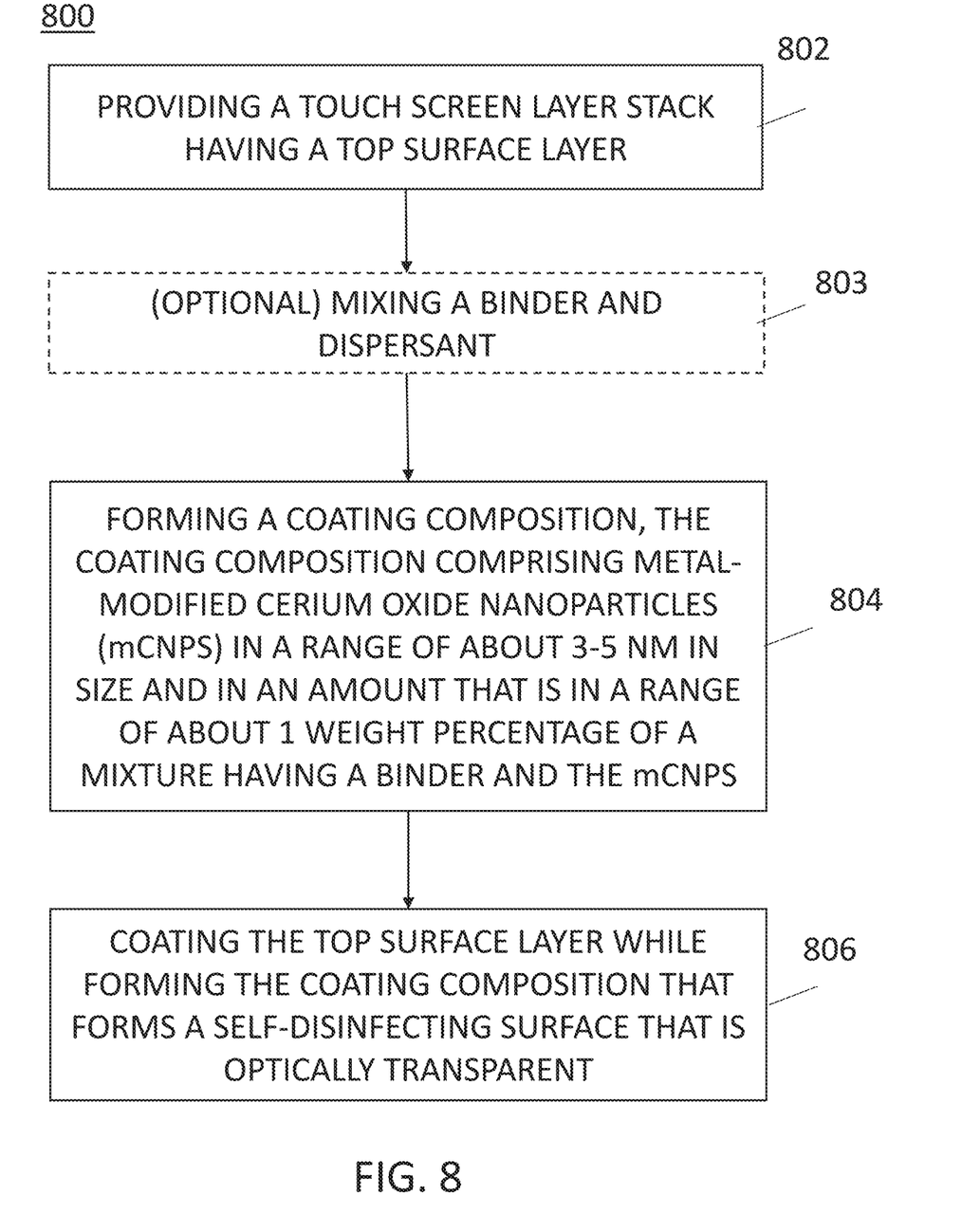
FIG. 8 illustrates a flowchart of a method for forming a touch screen display.

FIG. 8 illustrates a flowchart of a method 800 for forming a touch screen display. The method may be performed in the order shown or a different order. One or more of the blocks or steps may be performed contemporaneously. Additionally, one or more blocks or steps may be added or deleted.

The method 800 may include, at 802, providing a touch screen layer stack that includes a top surface layer. The method 800 may include, at 804, forming a coating composition, the coating composition comprising metal-modified cerium oxide nanoparticles (mCNPs) in a range of about 3-30 nm or 3-35 nm in size and in an amount that is in a range of about 1 weight percentage of a mixture having a binder and the mCNPs. In some embodiments, the mCNPs are mixed with a dispersant prior to fabrication into ITO/binder.

The mixture of the coating composition may have a dispersant additive, a binder, or dispersant additive and binder with the mCNPs. The dispersant additive may include a copolymer with oxide-affinic groups or polymer non-ionic dispersing additive. The binder may include polyvinyl pyrrolidone (PVP).

The method 800 may include, at 806, coating the top surface layer while forming the coating composition that forms a self-disinfecting surface that is optically transparent.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

Embodiments are described herein with reference to the attached figures wherein like reference numerals are used throughout the figures to designate similar or equivalent elements. In some instances, figures are not drawn to scale and they are provided merely to illustrate aspects disclosed herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

What is claimed is:

1. A self disinfecting touch screen display comprising:
a touch screen layer stack having a plurality of layers that includes a top surface layer; and
a coating composition coating the top surface layer, the coating composition comprising metal-modified cerium oxide nanoparticles (mCNPs) having a predominantly 3+ cerium surface charge and in a range of about 3-30 nm in size and in an amount that is in an amount of about a 1 weight percentage of a mixture having a binder and the mCNPs where m is an antimicrobial promoting metal that is non-ionizing.

2. The touch screen display according to claim 1, wherein the touch screen layer stack comprises one of a liquid crystal display (LCD), a light emitting diode (LED) display, an organic light-emitting diode (OLED) display, a quantum dot display (QLED), and a liquid crystal on silicon (LCoS) display.

3. The touch screen display according to claim 1, wherein the binder includes one of alkali silicate, borate, phosphate and polyvinyl pyrrolidone.

4. The touch screen display according to claim 1, wherein the binder includes alkali silicate that comprises $SiO_2$ and $Alk_2O$, wherein Alk comprises Li, Na or K at a ratio from about 0.05:1 to about 20.0:1 $SiO_2:Alk_2O$.

5. The touch screen display according to claim 1, wherein the antimicrobial promoting metal is selected from the group consisting of silver, gold, ruthenium, vanadium, copper, titanium, nickel, platinum, titanium, tin, zinc and iron.

6. The touch screen display according to claim 1, wherein antimicrobial promoting metal comprises a metallic non-ionic silver.

7. The touch screen display according to claim 1, wherein the touch screen layer stack includes resistive or capacitive elements below the top surface layer, the resistive or capacitive elements are made of one of indium tin oxide (ITO) and antimony tin oxide (ATO).

8. The touch screen display according to claim 1, wherein the coating composition is a self-disinfecting surface that is optically transparent.

9. The touch screen display according to claim 1, wherein the coating composition further comprises:
a dispersant additive including a copolymer with oxide-affinic groups or polymer non-ionic dispersing additive, and
the binder includes polyvinyl pyrrolidone.

10. An electronic device comprising:
electronic circuitry; and
the touch screen display of claim 1, interfaced with the electronic circuitry.

11. The electronic device according to claim 10, wherein the touch screen display comprises one of a liquid crystal display (LCD), a light emitting diode (LED) display, an organic light-emitting diode (OLED) display, a quantum dot display (QLED) and a liquid crystal on silicon (LCoS) display.

12. The electronic device according to claim 10, wherein the binder includes one of alkali silicate, borate, phosphate and polyvinyl pyrrolidone.

13. The electronic device according to claim 10, wherein the binder includes alkali silicate that comprises $SiO_2$ and $Alk_2O$, wherein Alk comprises Li, Na or K at a ratio from about 0.05:1 to about 20.0:1 $SiO_2:Alk_2O$.

14. The electronic device according to claim 10, wherein the antimicrobial promoting metal is selected from the group consisting of silver, gold, ruthenium, vanadium, copper, titanium, nickel, platinum, titanium, tin, zinc and iron.

15. The electronic device according to claim 10, wherein the antimicrobial promoting metal comprises a stable metallic silver that is non-ionizing.

16. The electronic device according to claim 10, wherein the touch screen display includes resistive or capacitive elements below the top surface layer, the resistive or capacitive elements are made of one of indium tin oxide (ITO) and antimony tin oxide (ATO).

17. The electronic device according to claim 10, wherein the coating composition is a self-disinfecting surface that is optically transparent.

18. A method of forming a touch screen display of claim 1, comprising:
providing the touch screen layer stack that includes a top surface layer;
forming a coating composition, the coating composition comprising metal-modified cerium oxide nanoparticles (mCNPs) having a predominantly 3+ cerium surface charge and in a range of about 3-30 nm in size and in an amount that is in an amount of about 1 weight percentage of a mixture having binder with the mCNPs where m is an antimicrobial promoting metal that is non-ionizing; and
coating the top surface layer while forming the coating composition that forms a self-disinfecting surface that is optically transparent.

19. The method according to claim 18, wherein the touch screen display comprises one of a liquid crystal display (LCD), a light emitting diode (LED) display, an organic light-emitting diode (OLED) display, a quantum dot display (QLED) and a liquid crystal on silicon (LCoS) display.

20. The method according to claim 18, wherein the binder includes alkali silicate that comprises $SiO_2$ and $Alk_2O$, wherein Alk comprises Li, Na or K at a ratio from about 0.05:1 to about 20.0:1 $SiO_2:Alk_2O$.

21. The method according to claim 18, wherein forming the coating composition comprises dip coating, spin coating, slot coating, vapor deposition, chemical deposition, spray deposition, sputtering, DC magnetron sputtering and direct nanoparticle deposition.

22. The method according to claim 18, wherein the mixture further comprises:
a dispersant additive including a copolymer with oxide-affinic groups or polymer non-ionic dispersing additive, and
the binder includes polyvinyl pyrrolidone; and
the forming of the coating composition further comprises mixing the dispersant and the binder.

23. A coating composition for coating a top surface layer of glass, comprising:
a binder;
metal-modified cerium oxide nanoparticles (mCNPs) in a range of about 3-30 nm in size and in an amount that is in an amount of about 1 weight percentage of a mixture having the binder and the mCNPs where m is an antimicrobial promoting metal that is non-ionizing; and a dispersant additive including a copolymer with oxide-affinic groups or polymer non-ionic dispersing additive, and the binder includes polyvinyl pyrrolidone.

\* \* \* \* \*